(12) United States Patent
Pezeshki et al.

(10) Patent No.: US 11,764,878 B2
(45) Date of Patent: Sep. 19, 2023

(54) LED CHIP-TO-CHIP VERTICALLY LAUNCHED OPTICAL COMMUNICATIONS WITH OPTICAL FIBER

(71) Applicant: AvicenaTech Corp., Sunnyvale, CA (US)

(72) Inventors: Bardia Pezeshki, Mountain View, CA (US); Robert Kalman, Mountain View, CA (US); Alexander Tselikov, Mountain View, CA (US); Cameron Danesh, Mountain View, CA (US)

(73) Assignee: AVICENATECH CORP., Mountain View, CA (US)

( * ) Notice: Subject to any disclaimer, the term of this patent is extended or adjusted under 35 U.S.C. 154(b) by 0 days.

(21) Appl. No.: 17/653,723

(22) Filed: Mar. 7, 2022

(65) Prior Publication Data
US 2022/0286211 A1    Sep. 8, 2022

Related U.S. Application Data

(60) Provisional application No. 63/157,413, filed on Mar. 5, 2021.

(51) Int. Cl.
| | |
|---|---|
| *H04B 10/00* | (2013.01) |
| *H04B 10/80* | (2013.01) |
| *G02B 6/12* | (2006.01) |
| *G02B 6/43* | (2006.01) |
| *G02B 6/42* | (2006.01) |

(52) U.S. Cl.
CPC ....... *H04B 10/803* (2013.01); *G02B 6/12021* (2013.01); *G02B 6/4298* (2013.01); *G02B 6/43* (2013.01)

(58) Field of Classification Search
CPC combination set(s) only.
See application file for complete search history.

(56) References Cited

U.S. PATENT DOCUMENTS

| | | |
|---|---|---|
| 5,844,239 A | 12/1998 | Kimura |
| 6,167,075 A | 12/2000 | Craig |
| 6,434,308 B1 | 8/2002 | Trezza |
| 7,373,033 B2 * | 5/2008 | Lu ............... G02B 6/4246 257/432 |
| 7,965,913 B2 | 6/2011 | Chan |

(Continued)

FOREIGN PATENT DOCUMENTS

JP    2011-014932    1/2011

OTHER PUBLICATIONS

International Search Report on related PCT Application No. PCT/US2022/071002 from International Searching Authority (KIPO) dated Jun. 23, 2022.

(Continued)

*Primary Examiner* — Agustin Bello
(74) *Attorney, Agent, or Firm* — KOS IP Law LLP

(57) ABSTRACT

Multi-chip modules in different semiconductor packages may be optically data coupled by way of LEDs and photodetectors linked by a multicore fiber. The multicore fiber may pass through apertures in the semiconductor packages, with an array of LEDs and photodetectors in the semiconductor package providing and receiving, respectively, optical signals comprised of data passed between the multi-chip modules.

10 Claims, 16 Drawing Sheets

(56) References Cited

U.S. PATENT DOCUMENTS

| | | | |
|---|---|---|---|
| 8,625,938 B2* | 1/2014 | Lee | G02B 6/428 |
| | | | 385/88 |
| 9,645,331 B1 | 5/2017 | Kim | |
| 10,025,047 B1 | 7/2018 | Liu et al. | |
| 10,718,886 B1* | 7/2020 | Sharma | H01L 33/36 |
| 11,515,356 B2* | 11/2022 | Pezeshki | H01L 25/167 |
| 2004/0159777 A1 | 8/2004 | Stone | |
| 2005/0168819 A1 | 8/2005 | Vail | |
| 2007/0058976 A1 | 3/2007 | Tatum | |
| 2007/0297713 A1* | 12/2007 | Lu | G02B 6/4246 |
| | | | 385/14 |
| 2009/0252451 A1 | 10/2009 | Lagakos | |
| 2012/0251045 A1 | 10/2012 | Budd | |
| 2014/0367711 A1* | 12/2014 | Bibl | H01L 24/24 |
| | | | 257/89 |
| 2015/0241645 A1 | 8/2015 | Khalid | |
| 2015/0341113 A1* | 11/2015 | Krug | H04B 10/116 |
| | | | 398/118 |
| 2015/0341119 A1* | 11/2015 | Fincato | H04B 10/503 |
| | | | 398/139 |
| 2016/0156999 A1* | 6/2016 | Liboiron-Ladouceur | |
| | | | H04Q 11/0005 |
| | | | 398/51 |
| 2016/0231508 A1* | 8/2016 | Butler | G02B 6/30 |
| 2018/0227055 A1 | 8/2018 | Khatibzadeh | |
| 2018/0269191 A1 | 9/2018 | England | |
| 2019/0312643 A1* | 10/2019 | Wijbrans | H04B 10/2581 |
| 2020/0292150 A1 | 9/2020 | Lai | |
| 2020/0386390 A1 | 12/2020 | Chen et al. | |
| 2020/0411587 A1* | 12/2020 | Pezeshki | G02B 6/4257 |
| 2021/0080664 A1* | 3/2021 | Pezeshki | G02B 6/4214 |
| 2021/0320718 A1* | 10/2021 | Kalman | H04B 10/801 |
| 2021/0320721 A1* | 10/2021 | Weverka | H04B 10/803 |
| 2021/0320726 A1* | 10/2021 | Kalman | H04B 10/803 |
| 2022/0050186 A1* | 2/2022 | Pezeshki | H01L 25/167 |
| 2022/0069914 A1* | 3/2022 | Kalman | H04B 10/40 |
| 2022/0102339 A1* | 3/2022 | Then | H01L 25/10 |
| 2022/0107456 A1* | 4/2022 | Kalman | G02B 6/428 |
| 2022/0113483 A1* | 4/2022 | Kalman | H01L 25/167 |
| 2022/0286211 A1* | 9/2022 | Pezeshki | G02B 6/12021 |
| 2022/0326438 A1* | 10/2022 | Messner | G02B 6/124 |
| 2022/0390693 A1* | 12/2022 | Krähenbühl | G02B 6/4228 |
| 2022/0393768 A1* | 12/2022 | Kalman | H04B 10/508 |

OTHER PUBLICATIONS

Written Opinion on related PCT Application No. PCT/US2022/071002 from International Searching Authority (KIPO) dated Jun. 23, 2022.

International Search Report on related PCT Application No. PCT/US2021/035249 from International Searching Authority (KIPO) dated Sep. 17, 2021.

Written Opinion on related PCT Application No. PCT/US2021/035249 from International Searching Authority (KIPO) dated Sep. 17, 2021.

Lee et al., Low-Cost and Robust 1-Gbit/s Plastic Optical Fiber Link Based on Light-Emitting Diode Technology, in Proc. Opt. Fiber Commun. Conf. Expo./Nat. Fiber Opt. Eng. Conf., 2008.

Yahav et al., Multi-Gigabit Spatial-Division Multiplexing Transmission Over Multicore Plastic Optical Fiber, Journal of Lightwave Technology, vol. 39, No. 8, Apr. 15, 2021, pp. 2296-2304.

* cited by examiner

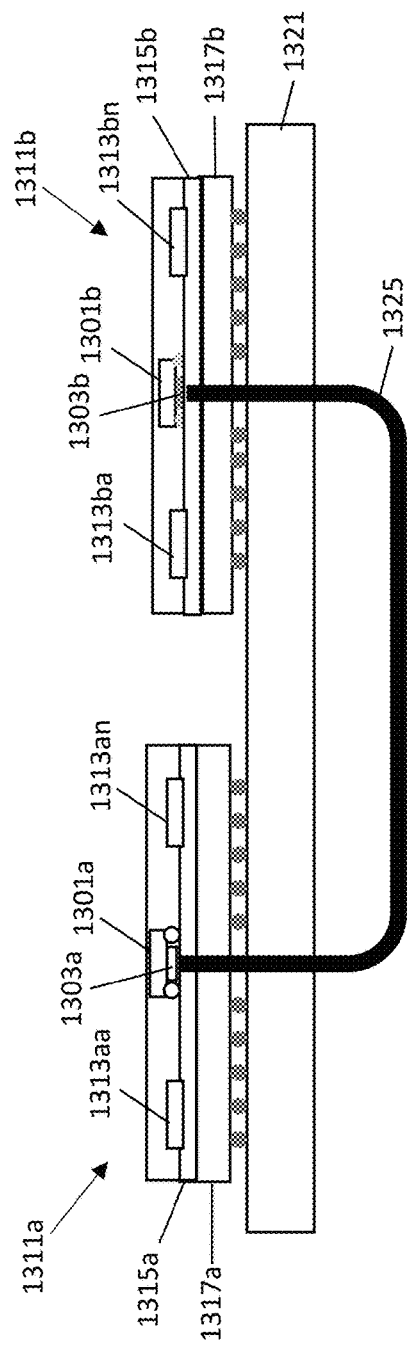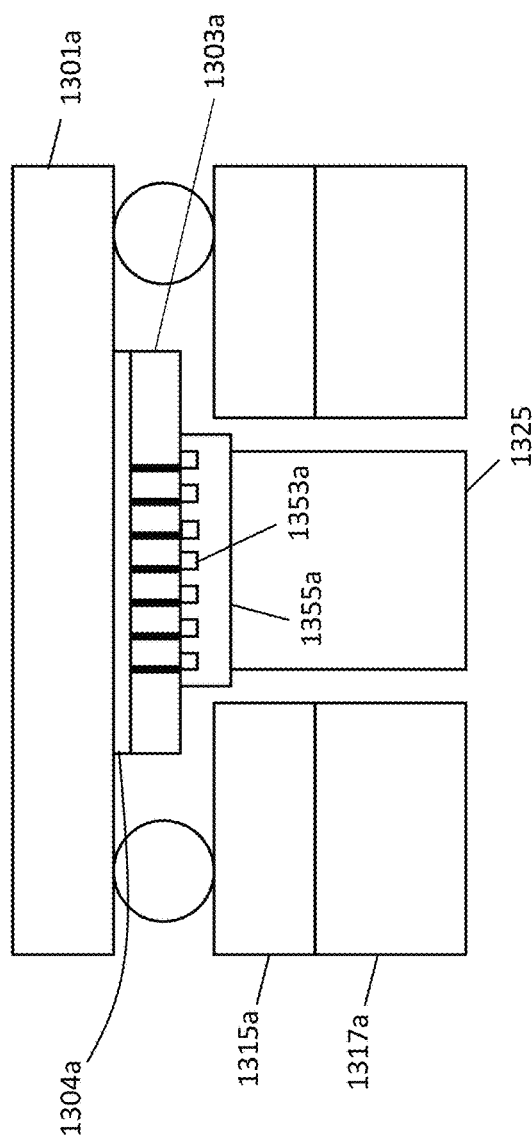
FIG. 13A
FIG. 13B

LED CHIP-TO-CHIP VERTICALLY LAUNCHED OPTICAL COMMUNICATIONS WITH OPTICAL FIBER

CROSS-REFERENCE TO RELATED APPLICATION(S)

This application claims the benefit of U.S. Provisional Patent Application No. 63/157,413, filed on Mar. 5, 2021, the disclosure of which is incorporated by reference herein.

FIELD OF THE INVENTIONS

The present invention relates generally to semiconductor chip-to-chip communications and more particularly to optical interconnects between semiconductor chips in different semiconductor packages.

BACKGROUND

Electronic devices with integrated circuits in semiconductor chips are ubiquitous. The semiconductor chips perform a variety of logic operations, including calculation functions, and often provide for memory storage related to those operations.

The semiconductor chips are generally within semiconductor packages, with the semiconductor packages mounted to a printed circuit board or the like. The semiconductor packages may contain a single semiconductor chip or, multiple semiconductor chips, for example in what is often termed a multi-chip module. Multi-chip modules may allow for use of semiconductor chips of smaller size, potentially increasing effective manufacturing yield, while still allowing for provision of increased functionality within a single semiconductor package.

Many devices include several semiconductor packages on a circuit board, and some devices may even include multiple circuit boards. Unfortunately, transmission of electrical signals across a circuit board may pose problems for proper device operation. Metal signal traces on or in a circuit board generally have a discrete resistances and capacitances that increase with trace length, and the traces may be considered lengthy, particularly considering operating speeds of the integrated circuits in the semiconductor chips. The resistances and capacitances may result in undue signal loss, signal delay, and possibly other problems.

Overcoming issues relating to signal loss and signal delay may result in increased power consumption in generating signals that are to traverse portions of the circuit board, as well as possibly increased power consumption in operating circuitry in a receiving chip to recover received signals. Moreover, operations of the integrated circuits in one semiconductor package may depend on signals received across the circuit board, for example processor operations dependent on information in memory in another semiconductor package. Delays in electrical transmission of those signals across the circuit board may effectively limit speed of those operations, and possibly the device as a whole.

BRIEF SUMMARY OF THE INVENTIONS

Some embodiments provide one or more circuit boards with semiconductor packages optically interconnected by a multicore fiber, with the semiconductor packages each including one or more semiconductor logic and/or memory chips, transceiver circuitry, and an array including microLEDs and photodetectors for providing light to or receiving light from the multicore fiber. The multicore fiber may be arranged on a side of the circuit board opposite a side of the circuit board to which the semiconductor packages are mounted.

Some embodiments provide an optically interconnected system, comprising: first semiconductor logic circuitry mounted on a first substrate in a first semiconductor package; first transceiver circuitry electrically coupled to the first semiconductor logic circuitry; a plurality of first microLEDs electrically coupled to be driven by the first transceiver circuitry; a plurality of first photodetectors electrically coupled to provide signals to the first transceiver circuitry; second semiconductor logic circuitry mounted on a second substrate in a second semiconductor package; second transceiver circuitry electrically coupled to the second semiconductor logic circuitry; a plurality of second microLEDs electrically coupled to be driven by the second transceiver circuitry; a plurality of second photodetectors electrically coupled to provide signals to the second transceiver circuitry; and a multicore fiber with a first end positioned to receive light emitted by the first microLEDs and to provide light to the first photodetectors and a second end positioned to receive light emitted by the second microLEDs and to provide light to the second photodetectors. In some embodiments the multicore fiber is a coherent multicore fiber.

Some embodiments provide an optically interconnected system, comprising: a multicore fiber; a first semiconductor package with a first aperture to receive a first end of the multicore fiber; a second semiconductor package with a second aperture to receive a second end of the multicore fiber; first semiconductor logic circuitry mounted on a first substrate in the first semiconductor package; first transceiver circuitry, in the first semiconductor package, electrically coupled to the first semiconductor logic circuitry; a plurality of first microLEDs, in the first semiconductor package, electrically coupled to be driven by the first transceiver circuitry, the plurality of first microLEDs positioned to emit light into the first end of a multicore fiber; a plurality of first photodetectors, in the first semiconductor package, electrically coupled to provide signals to the first transceiver circuitry, the plurality of first photodetectors positioned to receive light from the first end of the multicore fiber; second semiconductor logic circuitry mounted on a second substrate in the second semiconductor package; second transceiver circuitry, in the second semiconductor package, electrically coupled to the second semiconductor logic circuitry; a plurality of second microLEDs, in the second semiconductor package, electrically coupled to be driven by the second transceiver circuitry, the plurality of second microLEDs positioned to emit light into the second end of the multicore fiber; and a plurality of second photodetectors, in the second semiconductor package, electrically coupled to provide signals to the second transceiver circuitry, the plurality of second photodetectors positioned to receive light from the second end of the multicore fiber.

In some embodiments the first transceiver circuitry is mounted to the first substrate and the second transceiver circuitry is mounted to the second substrate. In some embodiments the first semiconductor logic circuitry is in a first chip, the first transceiver circuitry is in a second chip, the second semiconductor logic circuitry is in a third chip, and the second transceiver circuitry is in a fourth chip. In some embodiments the first semiconductor logic circuitry is in a first chip, the first transceiver circuitry is in the first chip, the second semiconductor logic circuitry is in a second chip, and the second transceiver circuitry is in the second chip. In some embodiments the first photodetectors are formed in a first chip and the first microLEDs are mounted on the first chip, and the second photodetectors are formed in a second chip and the second microLEDs are mounted on the second chip. Some embodiments further comprise first microLED reflectors for reflecting light from the first microLEDs optically towards the first end of the multicore fiber and second microLED reflectors for reflecting light from the second microLEDs optically towards the second end of the multicore fiber. Some embodiments further comprise first photodetector reflectors for reflecting light from the first end of the multicore fiber optically towards the first photodetectors and second photodetector reflectors for reflecting light from the second end of the multicore fiber optically towards the second photodetectors. In some embodiments the first aperture is in a side of the first semiconductor package and the second aperture is in a side of the second semiconductor package. Some embodiments further comprise a first ninety degree reflector between the first LEDs and the first end of the multicore fiber and a second ninety degree reflector between the second LEDs and the second end of the multicore fiber. In some embodiments the first LEDs and the first photodetectors are arranged in a first array, with the first LEDs and the first photodetectors having mirror-image LED-photodetector symmetry about a plane bisecting the first array, and the second LEDs and the second photodetectors are arranged in a second array with the second LEDs and the second photodetectors having mirror-image LED-photodetector symmetry about a plane bisecting the second array, such that the first LEDs are linked via the multicore fiber with the second photodetectors and the second LEDs are linked via the multicore fiber with the first photodetectors. In some embodiments the multicore fiber is a coherent multicore fiber. In some embodiments the first semiconductor package is mounted to a circuit board and the second semiconductor package is mounted to the circuit board. In some embodiments the multicore fiber passes through a first circuit board aperture under the first semiconductor package and passes through a second circuit board aperture under the second semiconductor package. In some embodiments the multicore fiber is positioned to pass light through a third aperture in the first substrate and to pass light through a fourth aperture in the second substrate. In some embodiments the multicore fiber is positioned to pass light through a third aperture in the first substrate at least partially within the multicore fiber, with the multicore fiber at least partially within the third aperture in the first substrate, and wherein the multicore fiber is configured to pass light through a fourth aperture in the second substrate at least partially within the multicore fiber, with the multicore fiber at least partially within the fourth aperture in the second substrate. In some embodiments the multicore fiber is a coherent multicore fiber.

These and other aspects of the invention(s) are more fully comprehended upon review of this disclosure.

BRIEF DESCRIPTION OF THE FIGURES

FIG. 13A is a semi-block diagram, semi-side view of optically interconnected semiconductor packages on a circuit board, with an optical transceiver chip hybrid integrated with another chip, in accordance with aspects of the invention.

FIG. 13B is a semi-block diagram, cut-away semi-side view of portions about the optical transceiver chip of a first of the semiconductor packages of FIG. 13A.

DETAILED DESCRIPTION

Figure 1A:
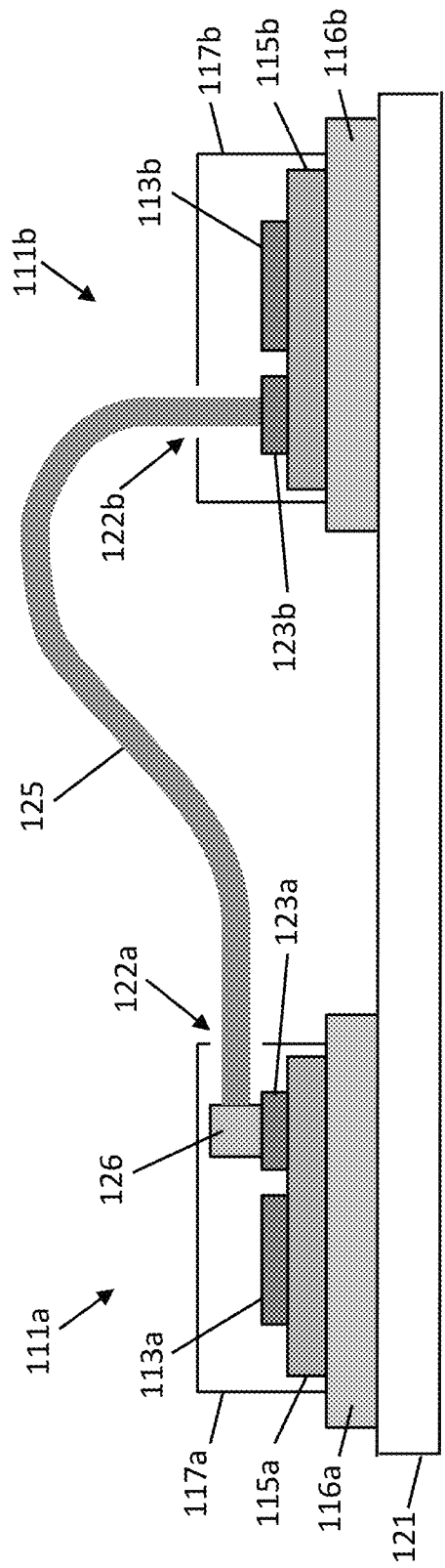
FIG. 1A is a semi-block diagram, semi-side view of optically interconnected semiconductor packages on a circuit board, with an optical transceiver chip on an interposer, in accordance with aspects of the invention.

FIG. 1A is a semi-block diagram, semi-side view of optically interconnected semiconductor packages on a circuit board, with an optical transceiver chip on an interposer, in accordance with aspects of the invention. FIG. 1A shows first and second multi-chip modules (MCMs) 111a,b mounted on a circuit board 121, which may be a printed circuit board (PCB). In some embodiments the MCMs may be mounted to separate circuit boards. Each MCM may be mounted to the circuit board by way of balls, with the balls providing for passage of electrical signals from the MCMs to the circuit board. The balls may be, for example, solder balls, which may be part of a ball grid array. Although only two MCMs are shown on the circuit board, in many embodiments the circuit board may have more MCMs, as well as a variety of single chip packages, discrete circuit elements, for example inductors and capacitors, and possibly a variety of connectors.

The first and second MCM each include a plurality of semiconductor chips. In FIG. 1A, a first of the semiconductor chips 113a,b includes integrated circuits configured, variously, for logic, processing, memory, or other operations. Although for each MCM only a single first of the semiconductor chips are shown, in some embodiments one or more of the MCMs may include a plurality of such semiconductor chips.

The semiconductor chips in each MCM are shown mounted on an interposer 115a,b, respectively. The interposers are each on a package substrate 116a,b. A package cover 117a,b is mated to the package substrate about edges of the package substrate, with the package cover having an interior cavity. The package cover and package substrate therefore form a semiconductor package which houses and generally encloses the interposers and semiconductor chips. Generally the interposer includes vias, and possibly redistribution layers, for passage of electrical signals between the semiconductor chips and to vias of the package. The vias of the package, in turn, are generally coupled to the solder balls electrically coupling the semiconductor packages to the circuit board.

The first and second MCMs also include semiconductor chips in the form of optical transceiver chips 123a,b. In the embodiments discussed herein the optical transceiver chips may be comprised of silicon semiconductor chips, with LEDs placed directly or indirectly on the silicon semiconductor chips. The optical transceiver chips may be termed an optical transceiver IC (OTRIC) at times. The optical transceiver chips are shown as mounted on the interposers 115a,b, with the optical transceiver chips also within the semiconductor packages 117a,b. The optical transceiver chips are electrically coupled to the first of the semiconductor chips in their respective packages by way of the interposers. The electrical couplings, which may include traces on or within the interposers, allow for passage of signals between the semiconductor chips and the optical transceiver chips.

The optical transceiver chips include circuitry for driving LEDs to generate light encoding data provided to the optical transceiver chips from the other semiconductor chips. The optical transceiver chips also include circuitry for amplifying and, in some embodiments, variously processing signals from photodetectors. The LEDs (not shown in FIG. 1A) may be microLEDs in various embodiments, and the LEDs may be mounted on the optical transceiver chip or on a substrate mounted to the optical transceiver chip. In some embodiments the LEDs are on what may be considered an upper surface of the optical transceiver chips, namely a surface away from the interposer on which the optical transceiver chips are mounted. The photodetectors may be formed in the optical transceiver chip, for example about the surface of the optical transceiver chip, or be mounted to the surface of the optical transceiver chip. In some embodiments the photodetectors are on or in what may be considered the upper surface of the optical transceiver chips.

In various embodiments discussed herein the LEDs are microLEDs. In some embodiments a microLED is made from a p-n junction of a direct-bandgap semiconductor material. In some embodiments a microLED is distinguished from a semiconductor laser (SL) as follows: (1) a microLED does not have an optical resonator structure; (2) the optical output from a microLED is almost completely spontaneous emission, whereas the output from a SL is dominantly stimulated emission; (3) the optical output from a microLED is temporally and spatially incoherent, whereas the output from a SL has significant temporal and spatial coherence; (4) a microLED is designed to be driven down to a zero minimum current, whereas a SL is designed to be driven down to a minimum threshold current, which is typically at least 1 mA. In some embodiments a microLED is distinguished from a standard LED by (1) having an emitting region of less than 10 μm×10 μm; (2) frequently having cathode and anode contacts on top and bottom surfaces, whereas a standard LED typically has both positive and negative contacts on a single surface; (3) typically being used in large arrays for display and interconnect applications.

A multicore fiber 125 is used in optically coupling the LEDs and photodetectors of the optical transceiver chip of the first MCM and the LEDs and photodetectors of the optical transceiver chip of the second MCM. In FIG. 1A, the first MCM includes an aperture 122a in a side of the package, with the multicore fiber passing through the aperture in the side of the package. A first end of the multicore fiber is positioned to receive light from and pass light to the LEDs and photodetectors by way of direction changing coupling optics 126 of the first MCM. The direction changing coupling optics are within the semiconductor package for the first MCM. In FIG. 1A, the direction changing coupling optics are shown as being on the upper surface of the optical transceiver chip. Also as shown in FIG. 1A, the first end of the multicore fiber is positioned to receive and provide light horizontally, at 90 degrees from a surface of a plane generally defined by a top of the optical transceiver chip.

Also in FIG. 1A, the second MCM includes an aperture 122b in a top of the package, with the multicore fiber passing through the aperture in the top of the package. The second MCM does not include direction changing coupling optics. Instead, a second end of the multicore fiber is positioned to receive light from and pass light to the LEDs and photodetectors of the second optical transceiver chip. In some embodiments the second MCM may instead have the multicore fiber passing through an aperture in the side of the package, and include the direction changing coupling optics of the first MCM. Conversely, in some embodiments the first MCM may have the multicore fiber passing through an aperture in the top of the package, and not include the direction changing coupling optics.

Figure 1B:
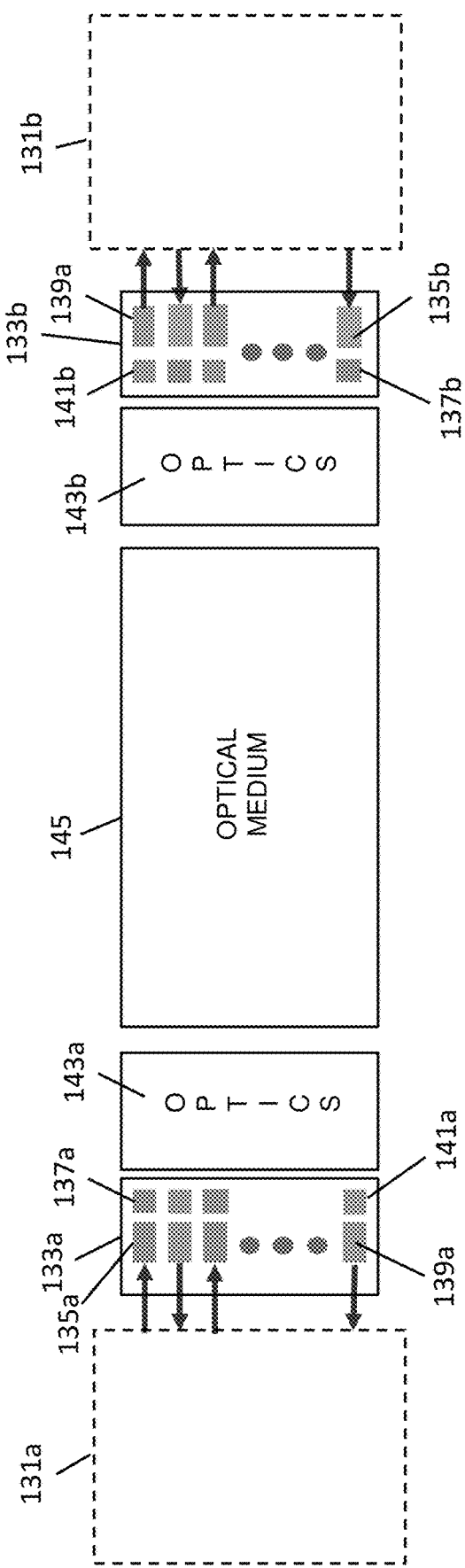
FIG. 1B is an example block diagram of optically coupled semiconductor packages, in accordance with aspects of the invention.

FIG. 1B is an example block diagram of optically coupled semiconductor packages. In some embodiments FIG. 1B is a block diagram for optical communication components of the device of FIG. 1A. In the block diagram of FIG. 1B, first and second semiconductor chips 131a,b exchange data using an optical medium 145. The first and second semiconductor chips may be considered endpoint ICs. The optical medium may be a multi-channel optical transmission medium. In FIG. 1B, a first semiconductor chip 131a provides data to and receives data from a first transceiver array 133a, over electrical connections. The first semiconductor chip includes integrated circuits configured, variously, for logic, processing, memory, or other operations, and may be the first semiconductor chip 111a of FIG. 1B. The first transceiver array may be in a separate chip, and in a same semiconductor package as the first semiconductor chip and, in various embodiments, on a same interposer as the first semiconductor chip. In some embodiments the first transceiver array is the optical transceiver chip 113a of FIG. 1A. The first transceiver array includes a plurality of transmission circuits 135a for driving LEDs 137a to generate light encoding data from the first semiconductor chip, and a plurality of receiver circuits 139a for amplifying and, in some embodiments recovering, data in signals provided by photodetectors 141a.

Optical coupling components 143a couple light from the LEDs into the optical medium 145, and couple light from the optical medium onto the photodetectors. In some embodiments the optical coupling components include light collector optics increase an amount of light generated by the LEDs that is provided to the optical medium and/or increase an amount of light from the optical medium that is provided to the photodetectors. In some embodiments, in addition or instead, the optical coupling components include focusing optics to focus light from the LEDs into the optical medium and/or focus light from the optical medium onto the photodetectors. In some embodiments, in addition or instead, the optical coupling components include direction changing optics to change a direction of light passing between the LEDs/photodetectors and the optical medium. In some embodiments the optical medium is a multicore fiber. In some embodiments the multicore fiber is a coherent multicore fiber.

Similarly, optical coupling components 143b couple light from LEDs 137b into the optical medium 145, and couple light from the optical medium onto photodetectors 141b. The optical coupling components 143b may be the same as the optical coupling components 143a, or the optical coupling components 143b may have only some of the features of the optical coupling components 143a. The LEDs 137b and photodetectors 141b are part of a second transceiver array 133b, with the second transceiver array also include receiver circuits 139b and transmission circuits 135b. The second transceiver array provides data to and receives data from a second semiconductor chip 131b. The second transceiver array and the second semiconductor chip may be in the form, packaged, and connected as discussed with respect to the first transceiver array and the first semiconductor chip.

Figure 2:
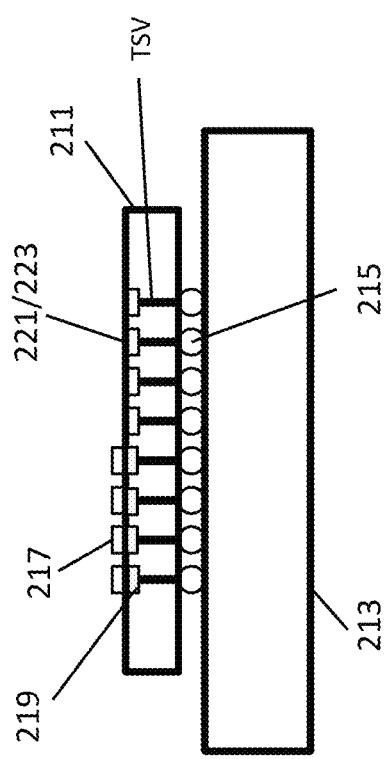
FIG. 2 illustrates, in diagrammatic form, an optical transceiver chip on an interposer, in accordance with aspects of the invention.

FIG. 2 illustrates a optical transceiver chip 211 on an interposer 213, in diagrammatic form. The optical transceiver chip has a first side coupled to the interposer by way of solder balls 215. The first side of the optical transceiver chip may be considered a bottom side of the optical transceiver chip, with the bottom side of the optical transceiver chip coupled to a top side of the interposer. The solder balls provide for communication of electrical signals between electrical paths of the interposer and electrical paths of the optical transceiver chip.

LEDs 217 are on a top of the optical transceiver chip. In some embodiments the LEDs are mounted to the top of the optical transceiver chip, in some embodiments the LEDs are mounted to substrate attached to or deposited on the top of the optical transceiver chip. Transmission circuitry 219 within the optical transceiver chip drives the LEDs to generate light, with the transmission circuitry driving the LEDs in accordance with electrical signals provided to the optical transceiver chip by way of the interposer.

Photodetectors 221 are within a top of the optical transceiver chip. The photodetectors generate electrical signals based on received light, with the electrical signals provided to receive circuitry 223 within the optical transceiver chip. The receive circuitry generally amplifies the electrical signals from the photodetectors, and in some embodiments performs additional processing of the amplified signals. The amplified signals, which are further processed in some embodiments, are passed through to the interposer.

In FIG. 2, the LEDs are shown as arranged in a first block, with the photodetectors arranged in a second block adjacent to the first block. The blocks, both together and separate, may be considered as forming an array of LEDs and photodetectors, or an array of LEDs and array of photodetectors. In various embodiments the LEDs and the photodetectors may be otherwise arranged, for example with LEDs and photodetectors interspersed in the same block.

Figure 3:
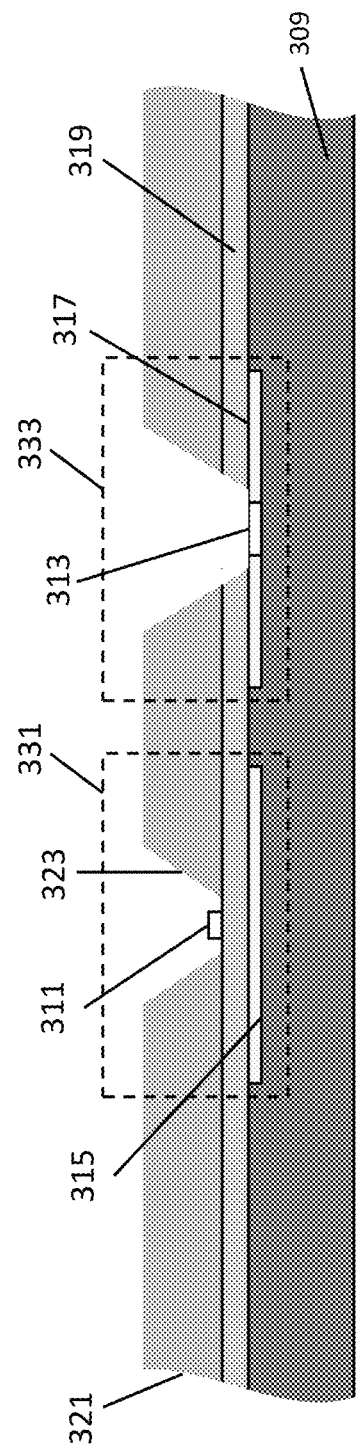
FIG. 3 shows a partial cross-section of an example optical transceiver chip, in accordance with aspects of the invention.

FIG. 3 shows a partial cross-section of an example optical transceiver chip. The partial cross-section of FIG. 3 shows only a single LED 311 and a single photodetector 313, in various embodiments the optical transceiver chip includes many more LEDs and photodetectors.

The optical transceiver chip includes a silicon semiconductor substrate 309. The silicon semiconductor substrate includes transmission circuitry 315 for driving the LED, and receive circuitry 317 for processing signals from the photodetector. In FIG. 3, the transmission circuitry is shown located near the LED, in a position in the semiconductor substrate under the LED. Similarly, FIG. 3 shows the receive circuitry located near the photodetector, generally about the photodetector. The transmission circuitry and the receive circuitry may be each electrically coupled to pads on a bottom surface of the silicon semiconductor substrate by one or more through-silicon vias, for example. The transmission circuitry generally receives a transmit data signal from another integrated circuit chip, and drives the LED based on the transmit data signal. In some embodiments the transmission circuitry includes various amplifier/buffer stages, equalization circuitry to enhance frequency response, and/or a variety of monitoring and control circuitry for performing this function. The receive circuitry generally receives a received data signal from the photodetector, and processes the signal from the photodetector for provision to the other integrated circuit chip. In some embodiments the receive circuitry includes a transimpedance amplifier (TIA) and subsequent amplifying stages, equalization circuitry, clock-and-data recovery, and/or a variety of other monitoring and control circuitry.

In the embodiment of FIG. 3, the photodetector is in the semiconductor substrate, monolithically integrated with the receive circuitry. In some embodiments the photodetector may be separately formed, and bonded to the receive circuitry using solder, thermal-compression bonding, or by means of Van der Waals forces.

An interconnect layer 319 is on top of the semiconductor substrate, other than about a location of the photodetector. The LED is on top of the interconnect layer, with the interconnect layer providing electrical signal pathways between the transmission circuitry and the LED.

A dielectric layer 321 is on top of the interconnect layer, other than about locations of the LED and photodetector. About locations of the LED and photodetector, the dielectric layer slopes away from those locations, forming sloping surfaces 323 that slope away from the locations of the LED and photodetector. In FIG. 3, the sloping surfaces are 30 degrees from the vertical (with the interconnect layer and dielectric layer being generally horizontal). In some embodiments the sloping surfaces are between 25 and 35 degrees from the vertical. In some embodiments the sloping surfaces are between 20 and 60 degrees from the vertical. The sloping surfaces assist in directing light from the LED into a waveguide (not shown in FIG. 3), which may be a multicore waveguide, and in directing light from the waveguide to the photodetector. The sloping surfaces may therefore be considered light collector optics. In some embodiments the sloping surfaces are metallized or otherwise coated with a reflective coating, to increase effectiveness of the light collector optics. In some embodiments the LED, transmission circuitry, and light collection optics about the LED may be considered an optical transmitter 331. Similarly, in some embodiments the photodetector, receive circuitry, and light collection optics about the photodetector may be considered an optical receiver 333.

Figure 4:
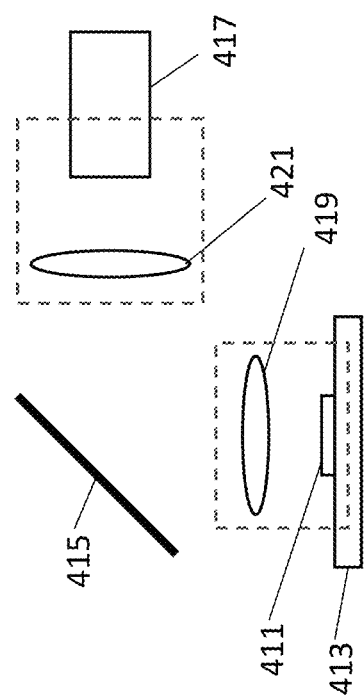
FIG. 4 is a semi-schematic showing direction changing coupling optics, in accordance with aspects of the invention.

FIG. 4 is a semi-schematic showing direction changing coupling optics. In FIG. 4, a optical transceiver chip 411 is on a substrate 413. In some embodiments the optical transceiver chip is as discussed in FIG. 1A through FIG. 3. The substrate may be, for example, an interposer in a semiconductor package. A top surface of the optical transceiver chip includes a plurality of LEDs and a plurality of photodetectors (not shown in FIG. 4).

A direction changing mirror 415 is in an optical path between the LEDs and photodetectors of the optical transceiver chip and an end of a multicore fiber 417. A first lens 419 images light from the LEDs onto the direction changing mirror, which reflects the light at a 90 degree angle towards the end of the multicore fiber. A second lens 421, between the direction changing mirror and the end of the multicore fiber, images the light into the multicore fiber. For light from the multicore fiber the reverse occurs, with the first second lens imaging the light onto the direction changing mirror, and the first lens imaging the reflected light onto the photodetectors. In the embodiment of FIG. 4, the first lens spans LEDs and photodetectors arrayed across the top of the entire optical transceiver chip.

Figure 5:
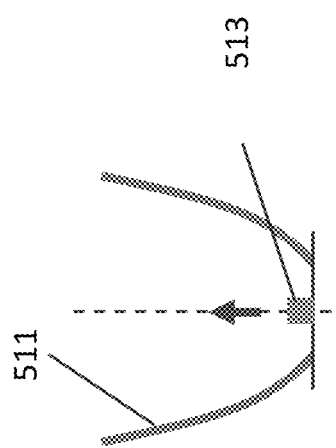
FIG. 5 shows the use of a parabolic reflector to efficiently capture light emitted at large angles from the LED and couple the light into an output waveguide, in accordance with aspects of the invention.

FIG. 5 shows the use of a parabolic reflector 511 to efficiently capture light emitted at large angles from an LED 513 and couple the light into an output waveguide. The parabolic reflector may be used in place of the sloped reflector of FIG. 3, for example. Depending on the LED design, the LED may emit significant lateral light from edge emission as well as vertical light from surface emission, and the parabolic reflector collects both of these well. As the parabola is made deeper and deeper, the angular spectrum of the output light is decreased while the size of the output optical distribution increases, which is the expected tradeoff. To produce an output angular spectrum that can be efficiently coupled to a waveguide with an NA of <0.3, the parabola may get quite deep.

Figure 6C:
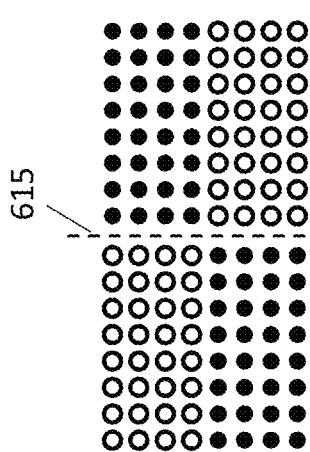
FIGS. 6A-D illustrate layout patterns for arrays of LEDs and photodetectors, in accordance with aspects of the invention.
Figure 6D:
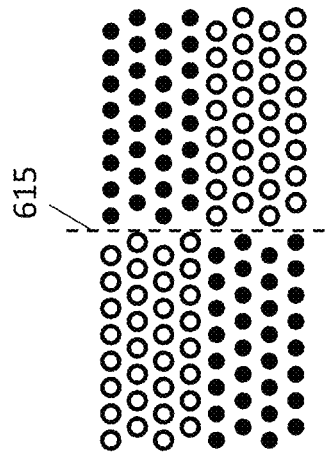
Figure 6B:
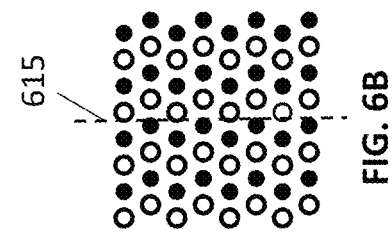
Figure 6A:
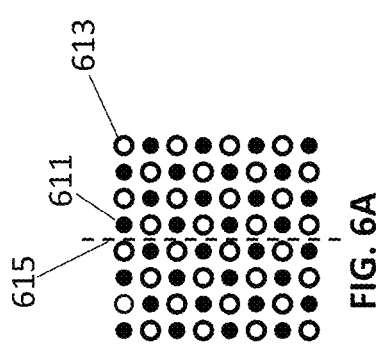

FIGS. 6A-D illustrate layout patterns for arrays of LEDs and photodetectors. The LEDs 611 and photodetectors 613 may be arranged about a top surface of a optical transceiver chip, for example. In FIG. 6A, LEDs and photodetectors are alternated with each other on a rectangular grid. In some embodiments, and as illustrated in FIG. 6A, the array of LEDs and photodetectors have mirror image LED-photodetector symmetry about a plane 615 bisecting the array. The use of mirror image LED-photodetector symmetry may be useful in arranging communication between LEDs and photodetectors on different optical transceiver chips, for example such that LEDs on one transceiver chip are linked, via a coherent multicore fiber for example, with photodetectors on another chip.

In FIG. 6B, LEDs and photodetectors are alternated with each other on a hexagonal grid, again with mirror image LED-photodetector symmetry about a plane 615 bisecting the array. Both of these configurations have each photodiode close to multiple LEDs, which can create electrical and optical crosstalk problems. These configurations may also be unattractive from a manufacturing/assembly standpoint because it may be easier to fabricate and assembly monolithic arrays of OE devices.

The problems associated with these alternating configurations can be overcome by "tiling" alternating arrays of microLEDs and photodetectors. FIG. 6C shows rectangular tiles of LEDs and photodetectors, with individual devices on a rectangular grid. FIG. 6D shows approximately rectangular tiles of microLEDs and photodetectors, with individual devices on a hexagonal grid. In both FIGS. 6C and 6D the array of LEDs and photodetectors again have mirror image LED-photodetector symmetry about a plane 615 bisecting the array.

Figure 7:
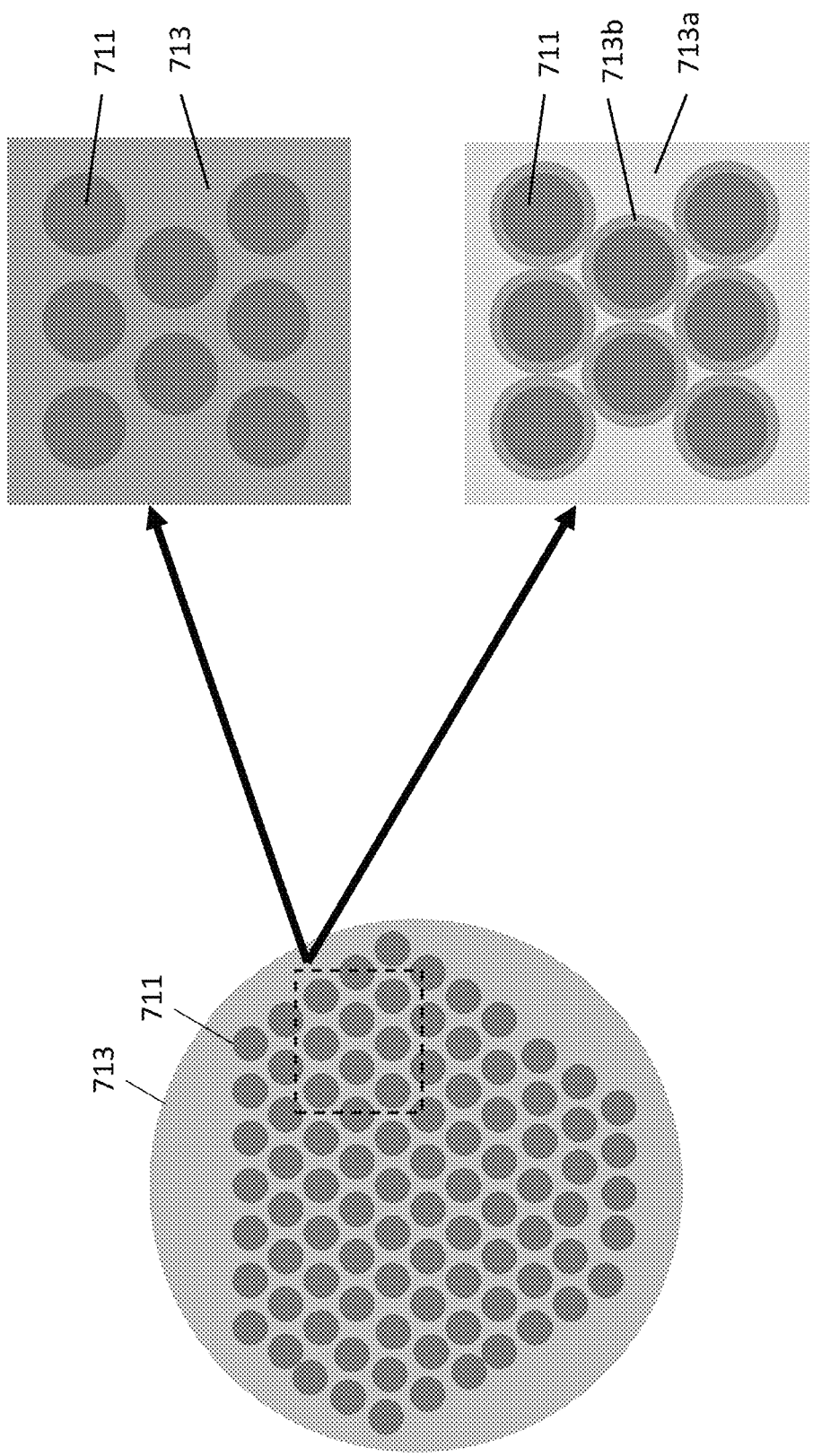
FIG. 7 is a cross-sectional illustration of various details of a multicore fiber, in accordance with aspects of the invention.

FIG. 7 is a cross-sectional illustration of various details of a multicore fiber. The multicore fiber includes a plurality of cores 711. Each core extends from a first end of the multicore fiber to a second end of the multicore fiber. Each core is surrounded by a cladding 713 that has a lower index of refraction. Light is guided in the core. Multimode cores (referring to the cores as surrounded by cladding) are preferred for use with microLED sources as multimode cores allow for greater coupling of light from microLEDs than for single-mode fiber. The numerical aperture (NA) of a core may be defined as $NA=\sin(\theta c)$, where $\theta c$ is the maximum external acceptance angle of the core (relative to the core's propagation axis); rays at angles larger than $\theta c$ are not guided by the core.

In some embodiments the cores are within a cladding medium 713a. In some embodiments each core is surrounded by a concentric cladding layer 713b.

A large number of cores may be grouped together in a "bundle." In some embodiments, the cores may be arranged in a regular pattern, such as on a square or hexagonal grid. In other embodiments, cores of multiple sizes may be used to improve packing density. A jacket material such as a polymer or glass may be used in the interstitial areas between the cores to hold the bundled cores together. In some embodiments, the jacket material is the same as the cladding material. In some embodiments, the jacket material may be highly optically absorbing to attenuate any light not propagating in a core.

In some embodiments the multicore fiber is a coherent multicore fiber. The bundle may be referred to as "coherent" if the relative positions of the cores are the same at the fiber output as at the fiber input, e.g. the cores do not cross over each other so the relative input and output positions of the cores are preserved. A coherent fiber bundle, for example a coherent multicore fiber, reproduces a spatially-sampled version of the optical distribution on its input face at its output face, where the spatial sampling resolution is equal to the core-to-core spacing.

Figure 8:
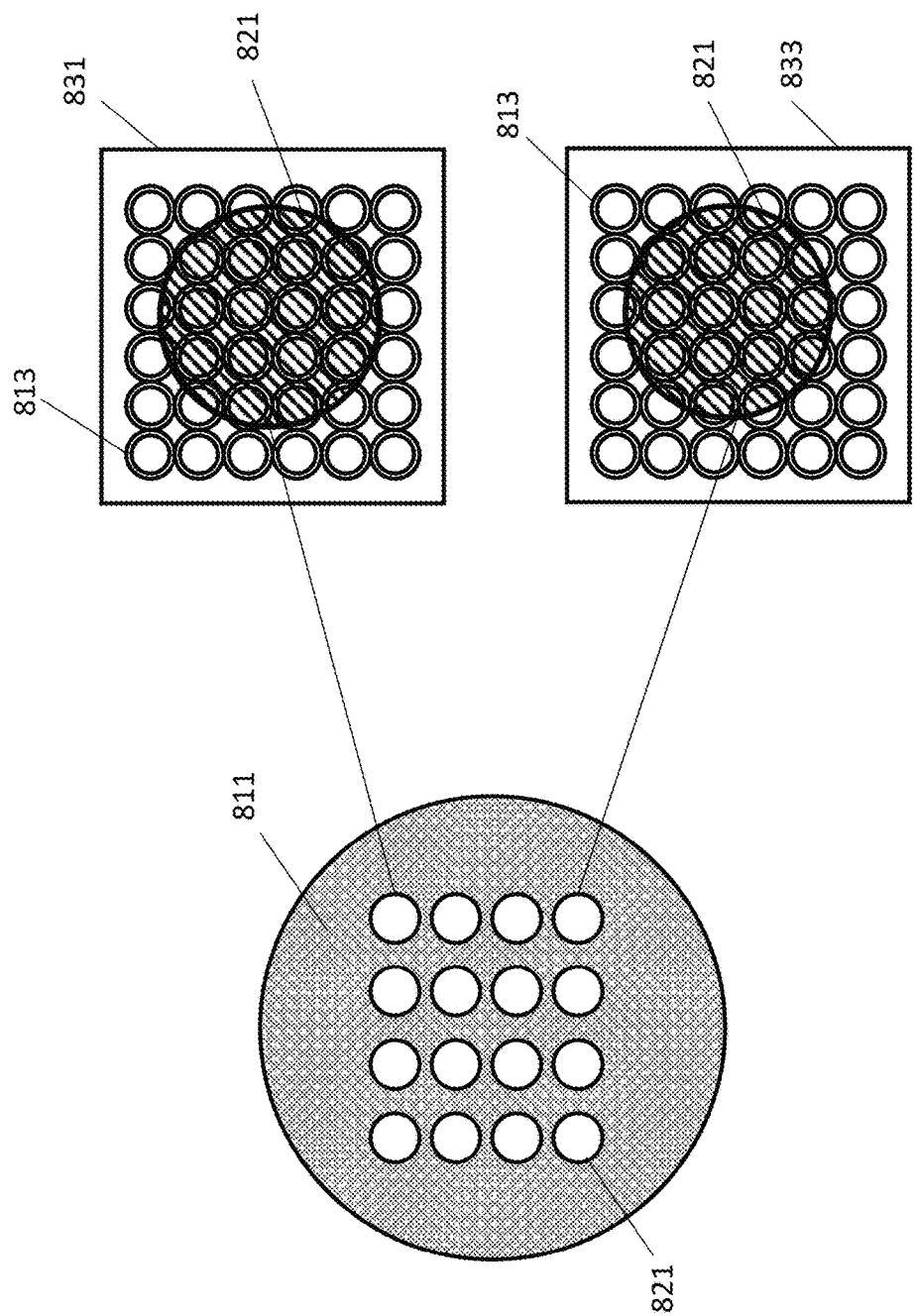
FIG. 8 illustrates a cross-sectional illustration of a coherent multicore fiber, as well as illustrating use of multiple cores to carry a signal from one or more LEDs to one or more photodetectors, in accordance with aspects of the invention.

FIG. 8 illustrates a cross-sectional illustration of a coherent multicore fiber, as well as illustrating use of multiple cores to carry a signal from one or more LEDs to one or more photodetectors. The coherent multicore fiber includes a plurality of cores 813, with the cores surrounded by cladding.

In FIG. 8, some of the cores carry signals, with FIG. 8 showing as an example 16 signals 821 carried by the multicore fiber. In some embodiments, each optical channel is coupled into and transmitted by a single core. In FIG. 8, however, each optical channel is coupled into and transmitted by multiple cores. A first exploded view 831 shows an input optical distribution 821 across multiple cores for one of the signals, and a second exploded view 833 shows a corresponding output optical distribution 821 across those cores. As the multicore fiber is a coherent multicore fiber, relative position of the cores is maintained between the input optical distribution and the output optical distribution.

The input optical distribution shows illumination of the cores by a signal for a single optical channel. In some embodiments the signal is generated by a single LED, although in some embodiments multiple LEDs may be used to generate the signal. The output optical distribution shows corresponding illumination of those cores by the signal. The output optical distribution is different from the input optical distribution in a number ways, including that (1) input light incident on the cladding and inter-cladding regions is lost; and (2) any non-uniformities in input illumination of each core will tend to be smoothed out so that the output intensity profile is approximately constant. In the case of partially-illuminated cores at the edge of the input optical distribution, at the output such cores exhibit approximately uniform intensity, resulting in some of the output light falling outside of the diameter of the input optical distribution. In some embodiments, the photodetector or concentrator associated with each optical channel is designed to efficiently capture this expanded output optical distribution, for instance through the use of a larger diameter photodetector and/or an optical concentrator with a larger input acceptance diameter.

Coupling light from each channel into multiple cores has the benefit of flexibly accommodating various optical configurations (e.g. different numbers of channels, different spot sizes from the LEDs). Differential phase shifts across cores could cause output speckle problems with a spatially coherent input, but the low spatial and temporal coherence of microLEDs tends to make speckle issues negligible.

Figure 9:
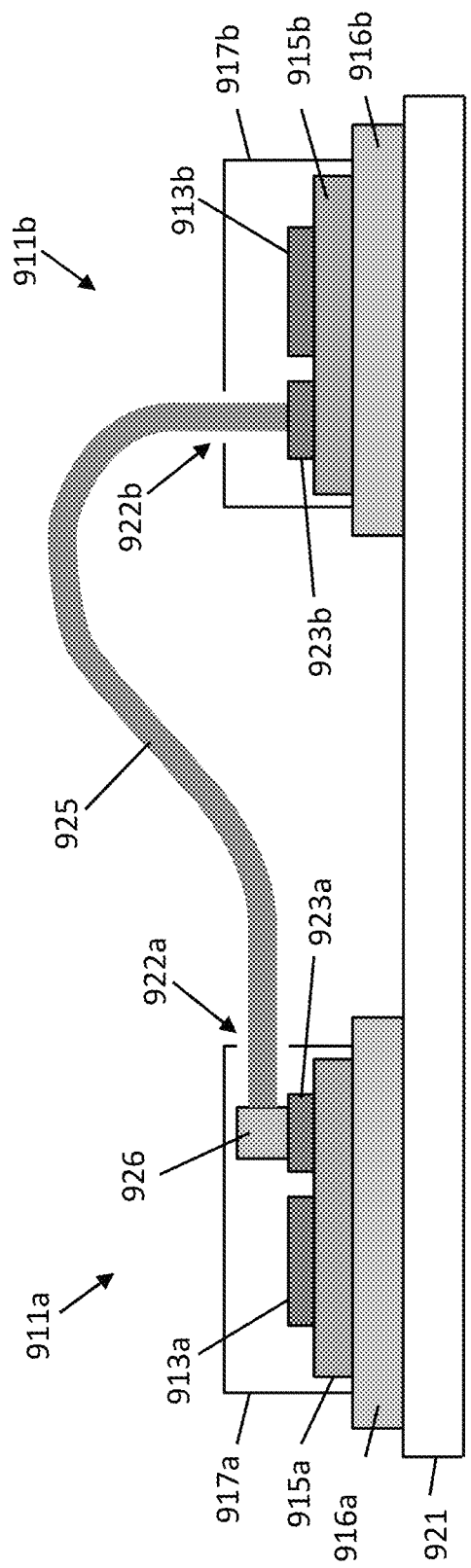
FIG. 9 is also a semi-block diagram, semi-side view of optically interconnected semiconductor packages on a circuit board, in accordance with aspects of the invention.

FIG. 9 is also a semi-block diagram, semi-side view of optically interconnected semiconductor packages on a circuit board, in accordance with aspects of the invention. The packages of FIG. 9 are similar to the packages of FIG. 1A. In FIG. 9, however, the packages do not include separate optical transceiver chips. Instead, the transceiver circuitry and photodetectors are monolithically integrated in the semiconductor chips including logic, processing, memory, or other functions.

As with FIG. 1A, FIG. 9 shows first and second multi-chip modules (MCMs) 911a,b mounted on a circuit board 921. In some embodiments the MCMs may be mounted to separate circuit boards. Each MCM may be mounted to the circuit board by way of balls, with the balls providing for passage of electrical signals from the MCMs to the circuit board. The balls may be, for example, solder balls, which may be part of a ball grid array. Although only two MCMs are shown on the circuit board, in many embodiments the circuit board may have more MCMs, as well as a variety of single chip packages, discrete circuit elements, for example inductors and capacitors, and possibly a variety of connectors.

The first and second MCM each include a plurality of semiconductor chips. In FIG. 9, first semiconductor chips 913a,b includes integrated circuits configured, variously, for logic, processing, memory, or other operations. Second semiconductor chips 923a,b also include integrated circuits configured, variously, for logic, processing, memory, or other operations. The second semiconductor chips, however, additionally include transceiver circuitry, photodiodes, with LEDs also mounted on the second semiconductor chips or on a substrate mounted to the second semiconductor chips. In FIG. 9, each MCM includes one first semiconductor chip and one second semiconductor chip. In various embodiments, however, each MCM may only include a single second semiconductor chip (and therefore also not be an MCM), or a plurality of either or both of the first semiconductor chips and the second semiconductor chips.

The transceiver circuitry of the second semiconductor chips include circuitry for driving LEDs to generate light encoding data provided to the optical transceiver chips from the other semiconductor chips. The transceiver circuitry also includes circuitry for amplifying and, in some embodiments, variously processing signals from photodetectors. The LEDs (not shown in FIG. 9) may be microLEDs in various embodiments. In some embodiments the LEDs are on what may be considered an upper surface of the optical transceiver chips, namely a surface away from the interposer on which the optical transceiver chips are mounted. The photodetectors may be formed in the optical transceiver chip, for example about the surface of the optical transceiver chip, or be mounted to the surface of the optical transceiver chip. In some embodiments the photodetectors are on or in what may be considered the upper surface of the optical transceiver chips.

As in FIG. 1A, the semiconductor chips in each MCM of FIG. 9 are shown mounted on an interposer 915a,b, respectively. The interposers are each on a package substrate 916a,b. A package cover 917a,b is mated to the package substrate about edges of the package substrate, with the package cover having an interior cavity. The package cover and package substrate therefore form a semiconductor package which houses and generally encloses the interposers and semiconductor chips. Generally, the interposer includes vias, and possibly redistribution layers, for passage of electrical signals between the semiconductor chips and to vias of the package. The vias of the package, in turn, are generally coupled to the solder balls electrically coupling the semiconductor packages to the circuit board.

The semiconductor chips in each package are electrically coupled to each other by way of electrical pathways in the interposers. The electrical pathways may include metal traces on or within the interposers, allow for passage of signals between the semiconductor chips.

Also as in FIG. 1A, in FIG. 9 a multicore fiber 925 is used in optically coupling the LEDs and photodetectors of the second semiconductor chip of the first MCM and the LEDs and photodetectors of the second semiconductor chip of the second MCM. In some embodiments the multicore fiber is as discussed with respect to FIGS. 7 and/or 8. The first MCM includes an aperture in a side of the package, with the multicore fiber passing through the aperture in the side of the package. A first end of the multicore fiber is positioned to receive light from and pass light to the LEDs and photodetectors by way of direction changing coupling optics 926 of the first MCM. The direction changing coupling optics are within the semiconductor package for the first MCM. In FIG. 9, the direction changing coupling optics are shown as being on the upper surface of the second semiconductor chip. In some embodiments the direction changing optics are as discussed with respect to FIG. 4. Also as shown in FIG. 9, the first end of the multicore fiber is positioned to receive and provide light horizontally, at 90 degrees from a surface of a plane generally defined by a top of the second semiconductor chip.

Also in FIG. 9, the second MCM includes an aperture in a top of the package, with the multicore fiber passing through the aperture in the top of the package. The second MCM does not include direction changing coupling optics. Instead, a second end of the multicore fiber is positioned to receive light from and pass light to the LEDs and photodetectors of the second semiconductor chip. In some embodiments the second MCM may instead have the multicore fiber passing through an aperture in the side of the package, and include the direction changing coupling optics of the first MCM. Conversely, in some embodiments the first MCM may have the multicore fiber passing through an aperture in the top of the package, and not include the direction changing coupling optics.

Figure 10:
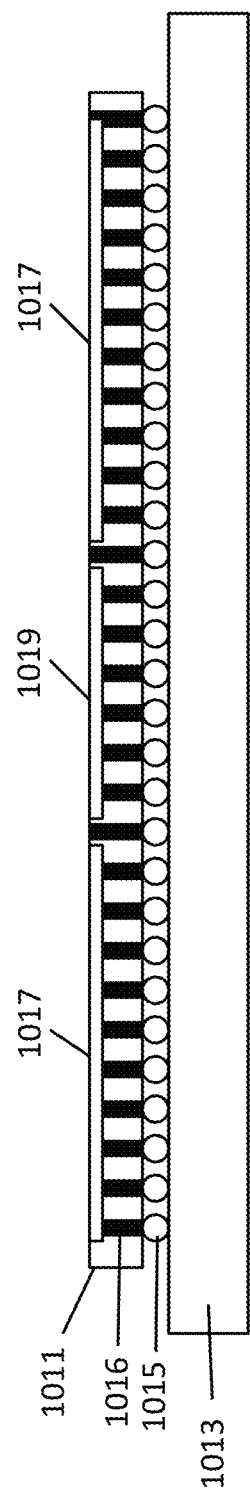
FIG. 10 illustrates a semiconductor chip including optical transceiver circuitry of FIG. 9 on an interposer, in diagrammatic form.

FIG. 10 illustrates a semiconductor chip including optical transceiver circuitry of FIG. 9 on an interposer, in diagrammatic form. The semiconductor chip 1011 has a first side coupled to the interposer 1013 (or package substrate) by way of solder balls 1015. The first side of the semiconductor chip may be considered a bottom side of the semiconductor chip, with the bottom side of the semiconductor chip coupled to a top side of the interposer. The solder balls provide for communication of electrical signals between electrical paths of the interposer and electrical paths of the semiconductor chip. The electrical paths of the semiconductor chip are shown as including through silicon vias (TSVs) 1016, which may carry electrical signals between the interposer and what may be considered "other" circuitry 1017 and optical transceiver circuitry 1019. The electrical signals provided by or to the interposer may be electrical signals provided by or to other semiconductor chips on the interposer. The other circuitry may be logic and/or other processing or memory circuitry, for example. The semiconductor chip also includes electrical signal paths for signals between the other circuitry and the optical transceiver circuitry.

Transmission circuitry of the optical transceiver circuitry drives LEDs to generate light, with the transmission circuitry driving the LEDs in accordance with electrical signals provided to the optical transceiver circuitry from the interposer or the other circuitry. In some embodiments the LEDs are mounted to the top of the optical transceiver chip, in some embodiments the LEDs are mounted to substrate attached to or deposited on the top of the optical transceiver chip.

Receive circuitry of the optical transceiver circuitry generally amplifies electrical signals from photodetectors. In some embodiments the receive circuitry performs additional processing of the amplified signals. The amplified signals, which are further processed in some embodiments, are passed through to the interposer or to the other circuitry. In some embodiments the photodetectors are within a top of the optical transceiver chip.

Figure 11:
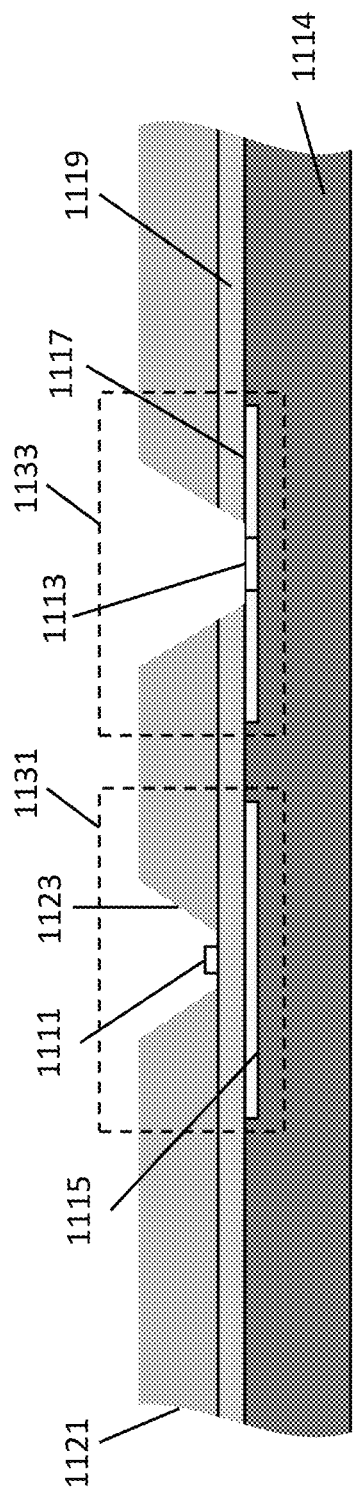
FIG. 11 shows a partial cross-section of an example semiconductor chip including optical transceiver circuitry, in accordance with aspects of the invention.

FIG. 11 shows a partial cross-section of an example semiconductor chip including optical transceiver circuitry. The partial cross-section of FIG. 11 shows only a single LED 1111 and a single photodetector 1113, in various embodiments the semiconductor chip including optical transceiver circuitry includes many more LEDs and photodetectors. The example semiconductor chip including optical transceiver circuitry of FIG. 11 is similar to the optical transceiver chip of FIG. 3. The chip of FIG. 11, however, additionally includes other semiconductor integrated circuitry 1101, for example for logic operation circuitry, memory circuitry, or other circuitry. In some embodiments the other semiconductor integrated circuitry may comprise one or more processor cores.

The chip includes a silicon semiconductor substrate 1114. The silicon substrate includes circuitry 1116 for performing logic, processing, memory, or other operations. In some embodiments the circuitry 1116 may provide a processor core. The silicon semiconductor substrate also includes transmission circuitry 1115 for driving the LED, and receive circuitry 1117 for processing signals from the photodetector. In FIG. 11, the transmission circuitry is shown located near the LED, in a position in the semiconductor substrate under the LED. Similarly, FIG. 11 shows the receive circuitry located near the photodetector, generally about the photodetector. The transmission circuitry and the receive circuitry may be each electrically coupled to pads on a bottom surface of the silicon semiconductor substrate by one or more through-silicon vias, for example. The transmission circuitry generally receives a transmit data signal from the circuitry 1116 or another integrated circuit chip, and drives the LED based on the transmit data signal. In some embodiments the transmission circuitry includes various amplifier/buffer stages, equalization circuitry to enhance frequency response, and/or a variety of monitoring and control circuitry for performing this function. The receive circuitry generally receives a received data signal from the photodetector, and processes the signal from the photodetector for provision to the circuitry 1116 or the other integrated circuit chip. In some embodiments the receive circuitry includes a transimpedance amplifier (TIA) and subsequent amplifying stages, equalization circuitry, clock-and-data recovery, and/or a variety of other monitoring and control circuitry.

In the embodiment of FIG. 11, the photodetector is in the semiconductor substrate, monolithically integrated with the receive circuitry. In some embodiments the photodetector may be separately formed, and bonded to the receive circuitry using solder, thermal-compression bonding, or by means of Van der Waals forces.

An interconnect layer 1119 is on top of the semiconductor substrate, other than about a location of the photodetector. The LED is on top of the interconnect layer, with the interconnect layer providing electrical signal pathways between the transmission circuitry and the LED. In some embodiments the interconnect layer may also provide electrical signal pathways between the circuitry 1116 and the transmission circuitry and/or receive circuitry.

A dielectric layer 1121 is on top of the interconnect layer, other than about locations of the LED and photodetector. About locations of the LED and photodetector, the dielectric layer slopes away from those locations, forming sloping surfaces 1123 that slope away from the locations of the LED and photodetector. In FIG. 11, the sloping surfaces are 30 degrees from the vertical (with the interconnect layer and dielectric layer being generally horizontal). In some embodiments the sloping surfaces are between 25 and 35 degrees from the vertical. In some embodiments the sloping surfaces are between 20 and 60 degrees from the vertical. The sloping surfaces assist in directing light from the LED into a waveguide 1123, which may be a multicore waveguide, and in directing light from the waveguide to the photodetector. The sloping surfaces may therefore be considered light collector optics. In some embodiments the sloping surfaces are metallized or otherwise coated with a reflective coating, to increase effectiveness of the light collector optics.

Figure 12A:
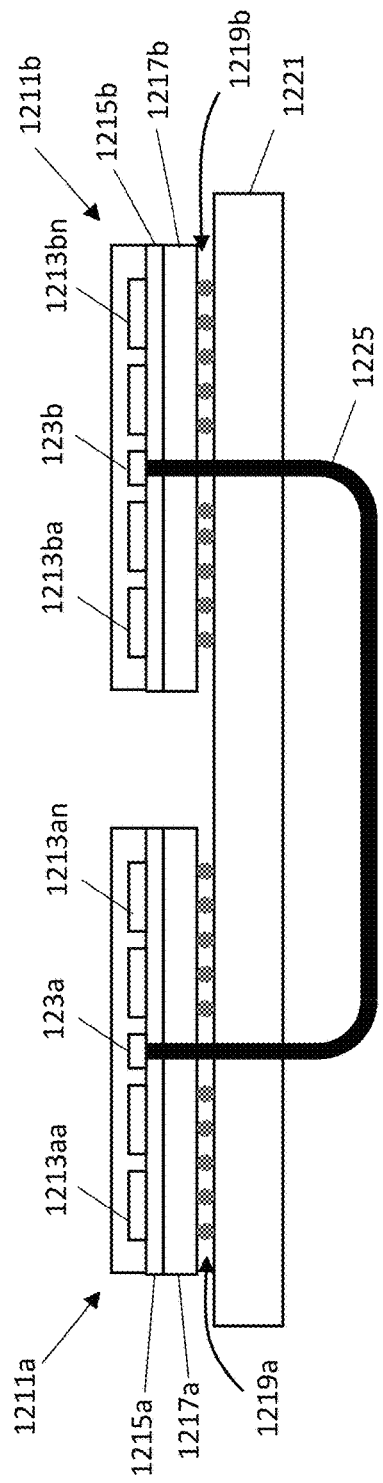
FIG. 12A is a semi-block diagram, semi-side view of optically interconnected semiconductor packages on a circuit board, with an optical transceiver chip on an interposer, in accordance with aspects of the invention.

FIG. 12A is a semi-block diagram, semi-side view of optically interconnected semiconductor packages on a circuit board, with a optical transceiver chip on an interposer, in accordance with aspects of the invention. FIG. 12A shows first and second multi-chip modules (MCMs) 1211a,b mounted on a circuit board 1221. Each MCM is shown as being mounted to the circuit board by way of balls 1219a,b, with the balls providing for passage of electrical signals from the MCMs to the circuit board. The balls may be, for example, solder balls, which may be part of a ball grid array. Although only two MCMs are shown on the circuit board, in many embodiments the circuit board may have more MCMs, as well as a variety of single chip packages, discrete circuit elements, for example inductors and capacitors, and possibly a variety of connectors.

The first and second MCM each include a plurality of semiconductor chips 1213aa-an, 1211ba-bn, respectively. The semiconductor chips include integrated circuits configured, variously, for logic, processing, memory, or other operations. The semiconductor chips in each MCM are shown mounted on an interposer 1215a,b, respectively. The interposers and semiconductor chips are each within a semiconductor package 1217a,b housing and generally enclosing the interposers and semiconductor chips. Generally the interposer includes vias, and possibly redistribution layers, for passage of electrical signals between the semiconductor chips and to vias of the package. The vias of the package, in turn, are coupled to the solder balls 1219a,b, electrically coupling the semiconductor packages to the circuit board.

The first and second MCMs also include semiconductor chips in the form of optical transceiver chips 1223a,b, respectively. The optical transceiver chips are shown as mounted on the interposers 1215a,b, with the optical transceiver chips also within the semiconductor packages 1217a, b. The optical transceiver chips are electrically coupled to at least one of the semiconductor chips (and in some embodiments all of the semiconductor chips) in their respective packages by way of the interposers. The electrical couplings, which may include traces on or within the interposers, allow for passage of signals between the semiconductor chips and the optical transceiver chips.

The optical transceiver chips include circuitry for driving LEDs to generate light encoding data provided to the optical transceiver chips from the other semiconductor chips. The optical transceiver chips also include circuitry for amplifying and, in some embodiments, variously processing signals from photodetectors. The LEDs (not shown in FIG. 12A) may be microLEDs in various embodiments, and the LEDs may be mounted on the optical transceiver chip or on a substrate mounted to the optical transceiver chip. The photodetectors may be formed in the optical transceiver chip, for example about the surface of the optical transceiver chip, or be mounted to the surface of the optical transceiver chip. The optical transceiver chips are mounted over an aperture in their respective interposers, with the LEDs and photodetectors positioned over (or within) the apertures. The packages also have apertures, aligned with the apertures of the interposers.

A multicore fiber 1225 optically links the LEDs and photodetectors of the optical transceiver chip of the first MCM and the LEDs and photodetectors of the optical transceiver chip of the second MCM. A first end of the multicore fiber is positioned to receive light from and pass light to the LEDs and photodetectors of the first optical transceiver chip. Similarly, a second end of the multicore fiber is positioned to receive light from and pass light to the LEDs and photodetectors of the second optical transceiver chip. In some embodiments, and as illustrated in FIG. 12A, between the ends, the multicore fiber passes largely through the apertures in the interposers, through the corresponding apertures in the packages, and through apertures in the circuit board, such that the multicore fiber generally extends between the MCMs along a side of the circuit board opposite the MCMs.

Figure 12B:
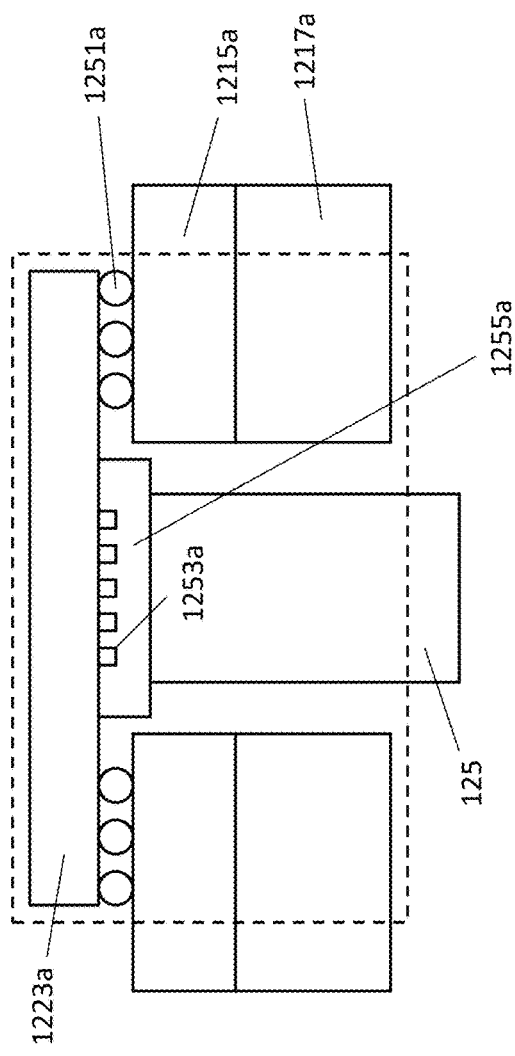
FIG. 12B is a semi-block diagram, cut-away semi-side view of portions about an optical transceiver chip of a first of the semiconductor packages of FIG. 12A.

FIG. 12B is a semi-block diagram, cut-away semi-side view of portions about a optical transceiver chip of a first of the semiconductor packages of FIG. 12A. FIG. 12B shows the optical transceiver chip 1223a mounted to the interposer 1215a. In FIG. 1B, the optical transceiver chip is mounted to the interposer by way of solder balls 1251a, in various embodiments the optical transceiver chip may be mounted to the interposer by other means. The interposer is on a portion of the package 1217a.

Both the interposer and the package include an aperture, with the apertures of both aligned so as to generally form a single continuous aperture through the interposer and package. The optical transceiver chip is mounted at least partially over the apertures. In various embodiments the apertures of the interposer and package may be of different sizes, for example having different cross-sectional radii or areas, and the apertures may not be considered continuous.

FIG. 12B shows LEDs 1253a on a surface of the optical transceiver chip facing the apertures. The LEDs may be mounted to the optical transceiver chip, directly or, in some embodiments, indirectly. The LEDs are positioned and/or configured to emit light in a direction towards the apertures. Similarly, photodetectors (not shown in FIG. 12B) may be placed in the surface of the optical transceiver chip facing the apertures, or, like the LEDs, be mounted to the optical transceiver chip, directly or indirectly. The photodetectors are positioned and/or configured to receive light in a direction from the apertures.

The multicore fiber 1225 extends through the aperture of the package, and into the aperture of the interposer. In some embodiments the fiber may only extend into the aperture of the package. The first end of the fiber faces towards the LEDs and optical transceiver chip. In some embodiments the first end may not itself face the LEDs and photodetectors, with instead the first end being optically coupled, for example through the use of direction changing mirrors, with the LEDs and photodetectors. In FIG. 12B, the fiber is coupled to a fiber attachment/alignment structure 1255a.

FIG. 13A is a semi-block diagram, semi-side view of optically interconnected semiconductor packages on a circuit board, with a optical transceiver chip hybrid integrated with another chip, in accordance with aspects of the invention. The embodiment of FIG. 13A is similar to that of the embodiment of FIG. 12A. In the embodiment of FIG. 13A, however, the optical transceiver chip is mounted to a one of the other semiconductor chips in the multi-chip modules.

Accordingly, FIG. 13A shows first and second multi-chip modules (MCMs) 1311a,b mounted on a circuit board 1321, for example by way of solder balls. The first and second MCM each include a plurality of semiconductor chips 1313aa-an, 1311ba-bn, respectively, including integrated circuits configured, variously, for logic, processing, memory, or other operations. The semiconductor chips in each MCM are shown mounted on an interposer 1315a,b, respectively. The interposers and semiconductor chips are each within a semiconductor package 1317a,b housing and generally enclosing the interposers and semiconductor chips. Generally, the interposer includes vias, and possibly redistribution layers, for passage of electrical signals between the semiconductor chips and to vias of the package. The vias of the package, in turn, electrically couple the semiconductor packages to the circuit board.

A one of the semiconductor chips 1301a,b of each of the first and second MCMs have optical transceiver chips 1303a,b, respectively, mounted under them, between the semiconductor chips 1301a,b and their interposers. In FIG. 13A, the optical transceiver chips are shown mounted between solder balls interconnecting the interposers and the semiconductor chips 1301a,b. The optical transceiver chips are positioned over apertures in the interposers, and apertures in the packages containing the interposers.

As with the embodiment of FIG. 12A, the optical transceiver chips of the embodiment of FIG. 13A include circuitry for driving LEDs to generate light encoding data provided to the optical transceiver chips from the other semiconductor chips. The optical transceiver chips also include circuitry for amplifying and, in some embodiments, variously processing signals from photodetectors. The LEDs (not shown in FIG. 13A) may be microLEDs in various embodiments, and the LEDs may be mounted on the optical transceiver chip or on a substrate mounted to the optical transceiver chip. The photodetectors may be formed in the optical transceiver chip, for example about the surface of the optical transceiver chip, or be mounted to the surface of the optical transceiver chip. The LEDs and photodetectors are positioned such that their emitted or received light passes in the direction of the apertures.

A multicore fiber 1325 optically links the LEDs and photodetectors of the optical transceiver chip of the first MCM and the LEDs and photodetectors of the optical transceiver chip of the second MCM. A first end of the multicore fiber is positioned to receive light from and pass light to the LEDs and photodetectors of the first optical transceiver chip. Similarly, a second end of the multicore fiber is positioned to receive light from and pass light to the LEDs and photodetectors of the second optical transceiver chip. In some embodiments, and as illustrated in FIG. 13A, between the ends, the multicore fiber passes largely through the apertures in the interposers, through the corresponding apertures in the packages, and through apertures in the circuit board, such that the multicore fiber generally extends between the MCMs along a side of the circuit board opposite the MCMs.

FIG. 13B is a semi-block diagram, cut-away semi-side view of portions about the optical transceiver chip of a first of the semiconductor packages of FIG. 13A. FIG. 13B shows the optical transceiver chip 1303a mounted to the semiconductor chip 1301a. The semiconductor chip 1301a is mounted to the interposer 1315a, with the optical transceiver chip between portions of the semiconductor chip 1301a and the interposer. In FIG. 13B the optical transceiver chip has a redistribution layer 1351a about the bottom surface of the semiconductor chip 1301a. Also in FIG. 13B, the semiconductor chip 1301a is mounted to the interposer by way of solder balls 1351a, with the optical transceiver chip having a height (in the direction from the interposer to the semiconductor chip 1301a) less than that of the solder balls. The interposer is on a portion of the package 1317a.

Both the interposer and the package include an aperture, with the apertures of both aligned so as to generally form a single continuous aperture through the interposer and package. The optical transceiver chip is mounted at least partially over the apertures. In various embodiments the apertures of the interposer and package may be of different sizes, for example having different cross-sectional radii or areas, and the apertures may not be considered continuous.

FIG. 13B shows LEDs 1353a on a surface of the optical transceiver chip facing the apertures. The LEDs may be mounted to the optical transceiver chip, directly or, in some embodiments, indirectly. The LEDs are positioned and/or configured to emit light in a direction towards the apertures. Similarly, photodetectors (not shown in FIG. 13B) may be placed in the surface of the optical transceiver chip facing the apertures, or, like the LEDs, be mounted to the optical transceiver chip, directly or indirectly. The photodetectors are positioned and/or configured to receive light in a direction from the apertures.

The multicore fiber 1325 extends through the aperture of the package, and into the aperture of the interposer. In some embodiments the fiber may only extend into the aperture of the package. The first end of the fiber faces towards the LEDs and optical transceiver chip. In some embodiments the first end may not itself face the LEDs and photodetectors, with instead the first end being optically coupled, for example through the use of direction changing mirrors, with the LEDs and photodetectors. In FIG. 13B, the fiber is coupled to a fiber attachment/alignment structure 1355a.

Figure 14A:
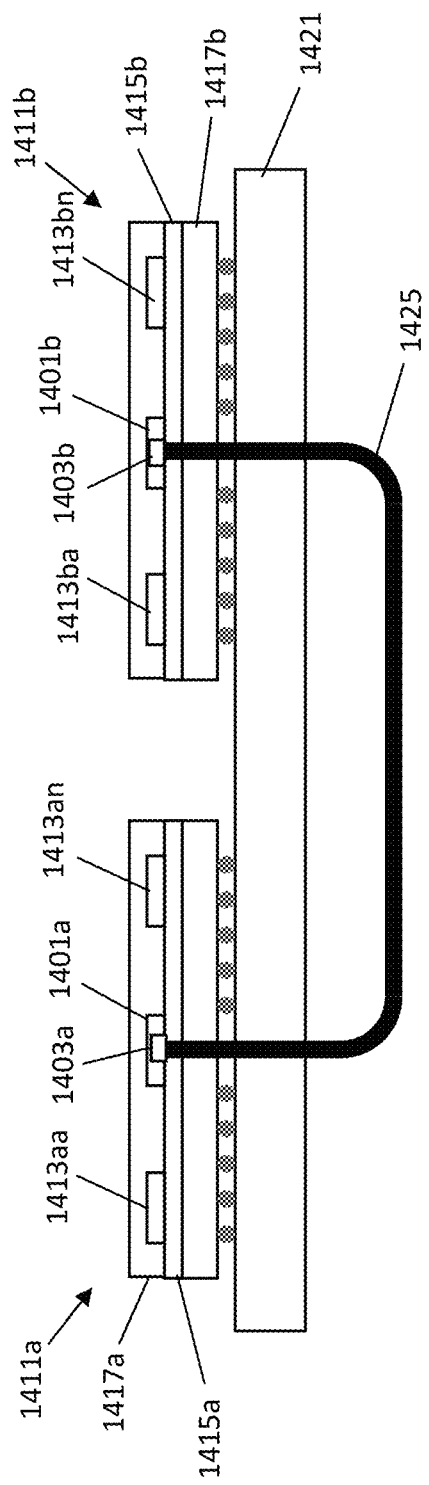
FIG. 14A is a semi-block diagram, semi-side view of optically interconnected semiconductor packages on a circuit board, with transceiver circuitry monolithically integrated with a chip, in accordance with aspects of the invention.

FIG. 14A is a semi-block diagram, semi-side view of optically interconnected semiconductor packages on a circuit board, with transceiver circuitry monolithically integrated with a chip, in accordance with aspects of the invention. The embodiment of FIG. 14A is similar to that of the embodiment of FIG. 13A. In the embodiment of FIG. 14A, however, optical transceiver circuitry is monolithically integrated in a one of the other semiconductor chips in the multi-chip modules.

Accordingly, FIG. 14A shows first and second multi-chip modules (MCMs) 1411a,b mounted on a circuit board 1421, for example by way of solder balls. The first and second MCM each include a plurality of semiconductor chips 1413aa-an, 1411ba-bn, respectively, including integrated circuits configured, variously, for logic, processing, memory, or other operations. The semiconductor chips in each MCM are shown mounted on an interposer 1415a,b, respectively. The interposers and semiconductor chips are each within a semiconductor package 1417a,b housing and generally enclosing the interposers and semiconductor chips. Generally, the interposer includes vias, and possibly redistribution layers, for passage of electrical signals between the semiconductor chips and to vias of the package. The vias of the package, in turn, electrically couple the semiconductor packages to the circuit board.

A one of the semiconductor chips 1401a,b of each of the first and second MCMs have optical transceiver circuitry 1303a,b, respectively, monolithically integrated into the semiconductor chips 1301a,b.

The optical transceiver circuitry includes circuitry for driving LEDs to generate light encoding data of the semiconductor chips, and, in some embodiments, data from the other semiconductor chips. The optical transceiver circuitry also includes circuitry for amplifying and, in some embodiments, variously processing signals from photodetectors. The LEDs (not shown in FIG. 14A) may be microLEDs in various embodiments, and the LEDs may be mounted on the semiconductor chip or on a substrate mounted to the semiconductor chip. The photodetectors may be formed in the semiconductor chip, for example about the surface of the semiconductor chip, or be mounted to the surface of the semiconductor chip. The LEDs and photodetectors are positioned such that their emitted or received light passes in the direction of the apertures.

A multicore fiber 1425 optically links the LEDs and photodetectors of the semiconductor chip of the first MCM and the LEDs and photodetectors of the semiconductor chip of the second MCM. A first end of the multicore fiber is positioned to receive light from and pass light to the LEDs and photodetectors of the first semiconductor chip. Similarly, a second end of the multicore fiber is positioned to receive light from and pass light to the LEDs and photodetectors of the second semiconductor chip. In some embodiments, and as illustrated in FIG. 14A, between the ends, the multicore fiber passes largely through the apertures in the interposers, through the corresponding apertures in the packages, and through apertures in the circuit board, such that the multicore fiber generally extends between the MCMs along a side of the circuit board opposite the MCMs.

Figure 14B:
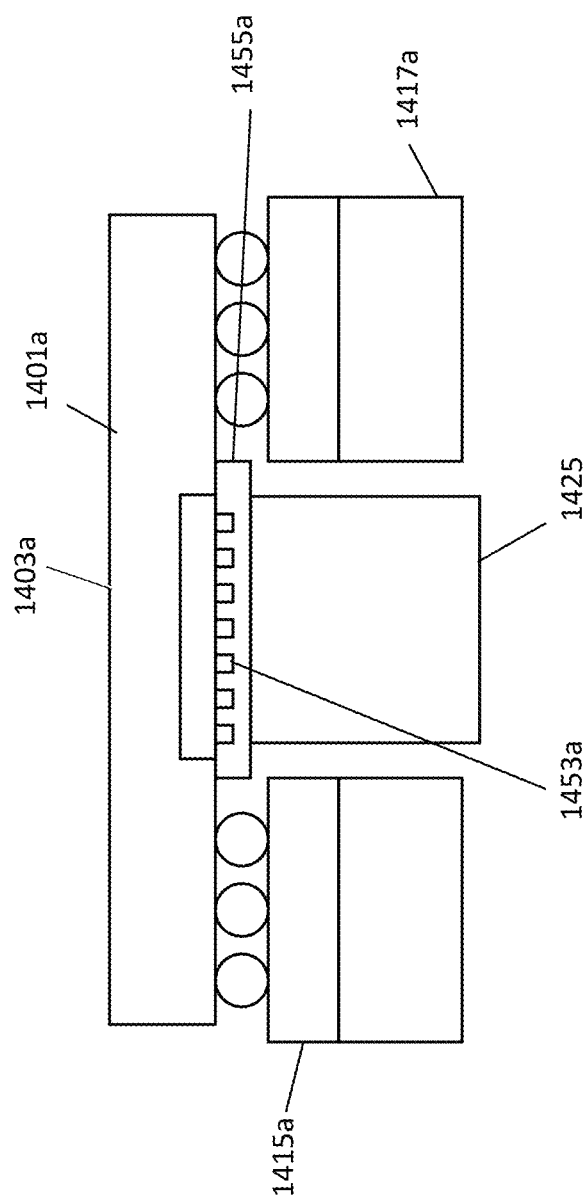
FIG. 14B is a semi-block diagram, cut-away semi-side view of portions about the transceiver circuitry of a first of the semiconductor packages of FIG. 14A.

FIG. 14B is a semi-block diagram, cut-away semi-side view of portions about the optical transceiver chip of a first of the semiconductor packages of FIG. 14A. FIG. 14B shows the semiconductor chip 1301a mounted to the interposer 1315a. The semiconductor chip 1301a is mounted to the interposer by way of solder balls 1351a. The interposer is on a portion of the package 1317a.

Both the interposer and the package include an aperture, with the apertures of both aligned so as to generally form a single continuous aperture through the interposer and package. The semiconductor chip is mounted at least partially over the apertures. In various embodiments the apertures of the interposer and package may be of different sizes, for example having different cross-sectional radii or areas, and the apertures may not be considered continuous.

FIG. 14B shows LEDs 1453a on a surface of the semiconductor chip facing the apertures. The LEDs may be mounted to the semiconductor chip, directly or, in some embodiments, indirectly. The LEDs are positioned and/or configured to emit light in a direction towards the apertures. Similarly, photodetectors (not shown in FIG. 14B) may be placed in the surface of the semiconductor chip facing the apertures, or, like the LEDs, be mounted to the semiconductor chip, directly or indirectly. The photodetectors are positioned and/or configured to receive light in a direction from the apertures.

The multicore fiber 1425 extends through the aperture of the package, and into the aperture of the interposer. In some embodiments the fiber may only extend into the aperture of the package. The first end of the fiber faces towards the LEDs and semiconductor chip. In some embodiments the first end may not itself face the LEDs and photodetectors, with instead the first end being optically coupled, for example through the use of direction changing mirrors, with the LEDs and photodetectors. In FIG. 14B, the fiber is coupled to a fiber attachment/alignment structure 1455a.

Although the invention(s) has been discussed with respect to various embodiments, it should be recognized that the invention comprises the novel and non-obvious claims supported by this disclosure.

What is claimed is:

1. An optically interconnected system, comprising:
a multicore fiber;
a first semiconductor package with a first aperture to receive a first end of the multicore fiber;
a second semiconductor package with a second aperture to receive a second end of the multicore fiber;
first semiconductor logic circuitry mounted on a first substrate in the first semiconductor package;
first transceiver circuitry, in the first semiconductor package, electrically coupled to the first semiconductor logic circuitry;
a plurality of first microLEDs, in the first semiconductor package, electrically coupled to be driven by the first transceiver circuitry, the plurality of first microLEDs positioned to emit light into the first end of the multicore fiber;
a plurality of first photodetectors, in the first semiconductor package, electrically coupled to provide signals to the first transceiver circuitry, the plurality of first photodetectors positioned to receive light from the first end of the multicore fiber;
second semiconductor logic circuitry mounted on a second substrate in the second semiconductor package;
second transceiver circuitry, in the second semiconductor package, electrically coupled to the second semiconductor logic circuitry;
a plurality of second microLEDs, in the second semiconductor package, electrically coupled to be driven by the second transceiver circuitry, the plurality of second microLEDs positioned to emit light into the second end of the multicore fiber; and
a plurality of second photodetectors, in the second semiconductor package, electrically coupled to provide signals to the second transceiver circuitry, the plurality of second photodetectors positioned to receive light from the second end of the multicore fiber;
wherein the first aperture is in a side of the first semiconductor package and the second aperture is in a side of the second semiconductor package;
wherein the plurality of first microLEDs and the plurality of first photodetectors are arranged in a first array, with the plurality of first microLEDs and the plurality of first photodetectors having mirror-image LED-photodetector symmetry about a plane bisecting the first array, and the plurality of second microLEDs and the plurality of second photodetectors are arranged in a second array with the plurality of second microLEDs and the plurality of second photodetectors having mirror-image LED-photodetector symmetry about a plane bisecting the second array, such that the plurality of first microLEDs are linked via the multicore fiber with the plurality of second photodetectors and the plurality of second microLEDs are linked via the multicore fiber with the plurality of first photodetectors.

2. The system of claim 1, wherein the first transceiver circuitry is mounted to the first substrate and the second transceiver circuitry is mounted to the second substrate.

3. The system of claim 1, wherein the first semiconductor logic circuitry is in a first chip, the first transceiver circuitry is in a second chip, the second semiconductor logic circuitry is in a third chip, and the second transceiver circuitry is in a fourth chip.

4. The system of claim 1, wherein the first semiconductor logic circuitry is in a first chip, the first transceiver circuitry is in the first chip, the second semiconductor logic circuitry is in a second chip, and the second transceiver circuitry is in the second chip.

5. The system of claim 1, wherein the plurality of first photodetectors are formed in a first chip and the plurality of first microLEDs are mounted on the first chip, and the plurality of second photodetectors are formed in a second chip and the plurality of second microLEDs are mounted on the second chip.

6. The system of claim 5, further comprising first microLED reflectors for reflecting light from the plurality of first microLEDs optically towards the first end of the multicore fiber and second microLED reflectors for reflecting light from the plurality of second microLEDs optically towards the second end of the multicore fiber.

7. The system of claim 6, further comprising first photodetector reflectors for reflecting light from the first end of the multicore fiber optically towards the plurality of first photodetectors and second photodetector reflectors for reflecting light from the second end of the multicore fiber optically towards the plurality of second photodetectors.

8. The system of claim 1, further comprising a first ninety degree reflector between the plurality of first microLEDs and the first end of the multicore fiber and a second ninety degree reflector between the plurality of second microLEDs and the second end of the multicore fiber.

9. The system of claim 1, wherein the first semiconductor package is mounted to a circuit board and the second semiconductor package is mounted to the circuit board.

10. The system of claim 1, wherein the multicore fiber is a coherent multicore fiber.

* * * * *